(12) United States Patent
Hatton

(10) Patent No.: US 8,224,523 B2
(45) Date of Patent: Jul. 17, 2012

(54) AUTOMATIC EMERGENCY CALL LANGUAGE PROVISIONING

(75) Inventor: David Anthony Hatton, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 12/705,762

(22) Filed: Feb. 15, 2010

(65) Prior Publication Data

US 2011/0202233 A1  Aug. 18, 2011

(51) Int. Cl.
*G06F 7/00* (2006.01)

(52) U.S. Cl. ............. 701/36; 701/24; 701/25; 701/31.5; 701/442; 701/484

(58) Field of Classification Search ............ 701/24, 701/25, 36, 31.5, 412, 442, 468, 469, 472, 701/484
See application file for complete search history.

(56) References Cited

U.S. PATENT DOCUMENTS

| | | | |
|---|---|---|---|
| 2001/0044302 A1 | 11/2001 | Okuyama | |
| 2009/0002145 A1 | 1/2009 | Berry et al. | |
| 2009/0261958 A1* | 10/2009 | Sundararajan et al. | 340/436 |
| 2010/0076764 A1* | 3/2010 | Chengalvarayan | 704/251 |
| 2010/0097239 A1* | 4/2010 | Campbell et al. | 340/825.25 |

FOREIGN PATENT DOCUMENTS

| | | |
|---|---|---|
| EP | 1507129 A1 | 2/2005 |
| EP | 22219163 A1 | 8/2010 |
| WO | 2008011432 A2 | 1/2008 |

OTHER PUBLICATIONS

Ford Motor Company, "Navigation System: SYNC," Owner's Guide Supplement, SYNC Version 1 (Jul. 2007).
Ford Motor Company, "SYNC," Owner's Guide Supplement, SYNC Version 1 (Nov. 2007).
Ford Motor Company, "Navigation System: SYNC," Owner's Guide Supplement, SYNC Version 2 (Oct. 2008).
Ford Motor Company, "SYNC," Owner's Guide Supplement, SYNC Version 2 (Oct. 2008).
Ford Motor Company, "Navigation System: SYNC," Owner's Guide Supplement, SYNC Version 3 (Jul. 2009).
Ford Motor Company, "SYNC," Owner's Guide Supplement, SYNC Version 3 (Aug. 2009).
Kermit Whitfield, "A hitchhiker's guide to the telematics ecosystem", Automotive Design & Production, Oct. 2003, http://findarticles.com, pp. 1-3.
European Patent Office, Extended European Search Report for the corresponding European Patent Application No. 11153638.9 mailed May 27, 2011.

* cited by examiner

*Primary Examiner* — Gertrude Arthur Jeanglaude
(74) *Attorney, Agent, or Firm* — Jennifer M. Stec; Brooks Kushman P.C.

(57) ABSTRACT

A method of language provisioning includes receiving a language designation as part of a packet sent from a communication point. The method also includes setting a local language emergency database (LLED) as a basis for a spoken language when placing emergency calls. According to this method, if an emergency call is originated by a vehicle computing system, outgoing communication from the vehicle computing system is performed at least substantially based on words and/or phrases stored in the LLED.

20 Claims, 4 Drawing Sheets

FIG. 3

| Base Language | Spanish | German | French |
|---|---|---|---|
| a | Sound_file_1 | Sound_file_2 | Sound_file_3 |
| a | Sound_file_4 | Sound_file_5 | Sound_file_6 |
| a | Sound_file_7 | Sound_file_8 | Sound_file_9 |
| a | Sound_file_10 | Sound_file_11 | Sound_file_12 |
| a | Sound_file_13 | Sound_file_14 | Sound_file_15 |
| | | | |

AUTOMATIC EMERGENCY CALL LANGUAGE PROVISIONING

BACKGROUND

1. Technical Field

The illustrative embodiments relate to a method and apparatus for automatically provisioning an emergency phone call placed by a vehicle computing system (including, but not limited to, recognizing local emergency call protocol, switching languages to a local language, etc.).

2. Background Art

Many vehicles come equipped with a variety of automatic computing systems. As computers grow more powerful, it is possible to add a multitude of functions to these computing systems.

For example, without limitation, the FORD SYNC system gives a user access to a powerful set of tools when traveling. The user can receive and make phone calls through the system, check email, send and receive text messages, check sports scores and weather, order carry out/drive-through food, play games, receive driving directions, etc.

In these illustrative examples, one method of connection is done through a user's cellular phone or other nomadic device. The vehicle computing system, such as, but not limited to, the FORD SYNC system, connects to the user's nomadic device, and uses that device to establish a connection with a remote network. Using connection options like Voice Over IP (VOIP) and/or a data connection, information can be sent to and from the vehicle computing system.

In addition to user initiated communication, it may be possible for the vehicle computing system to initiate communication on its own. The system may need to check a remote network for updates, or may need to process ongoing data transfer for a previously requested service.

In at least one instance, it may be desirable to have the vehicle equipped with functionality for automatically placing emergency phone calls in the event of a vehicle accident. Such a system is described in some detail in pending U.S. application Ser. No. 11/769,346, entitled "METHOD AND SYSTEM FOR EMERGENCY NOTIFICATION", filed Jun. 27, 2007; and U.S. application Ser. No. 12/399,513, entitled "METHOD AND SYSTEM FOR EMERGENCY CALL HANDLING", filed Mar. 6, 2009; and U.S. application Ser. No. 12/607,244, filed Oct. 28, 2009, entitled "METHOD AND SYSTEM FOR EMERGENCY CALL PLACEMENT". The contents of which are incorporated herein by reference.

Typically, when a call is placed, the language of the call will be determined by the language spoken by the vehicle computing system when communicating with the user, or by the default language as determined for a particular region, or determined at the end line of manufacturing, etc. For example, if the user has the vehicle computing system set to English, then the call will be placed in English. This has the potential, however, to create complications if the user drives the vehicle across a border between countries.

For example, if the user drove from America to Mexico, then the language may be set to English, but the emergency call may be placed to a Mexican Emergency Operator, and the operator may only speak Spanish. This could impair or even prevent successful completion of the emergency call.

SUMMARY

A first illustrative method of language provisioning includes receiving a language designation as part of a packet sent from a communication point.

In this illustrative embodiment, the method includes setting a local language emergency database (LLED) as a basis for a spoken language when placing emergency calls. According to this illustrative method, if an emergency call is originated by a vehicle computing system, outgoing communication from the vehicle computing system is performed at least substantially based on words and/or phrases stored in the LLED.

An illustrative vehicle communication system in communication with a nomadic device includes receiving programmed logic circuitry for receiving a language designation as part of a packet sent from a communication point to the nomadic device.

This illustrative system includes language setting programmed logic circuitry for setting a local language emergency database (LLED) as a basis for a spoken language when placing emergency calls. In this illustrative embodiment, if an emergency call is originated by the vehicle computing system, outgoing communication from the vehicle computing system is performed at least substantially based on words and/or phrases stored in the LLED.

In still another illustrative embodiment, a computer readable storage medium, stores instructions that, when executed by a processor in a vehicle computing system, cause the vehicle computing system to perform the following method. The illustrative method includes receiving a language designation as part of a packet sent from a communication point.

The illustrative method performed by the vehicle computing system also includes setting a local language emergency database (LLED) as a basis for a spoken language when placing emergency calls. Further, if an emergency call is originated by the vehicle computing system, outgoing communication from the vehicle computing system is performed at least substantially based on words and/or phrases stored in the LLED.

BRIEF DESCRIPTION OF THE DRAWINGS

Other aspects and characteristics of the illustrative embodiments will become apparent from the following detailed description of exemplary embodiments, when read in view of the accompanying drawings, in which:

FIG. 3 shows an example of a portion of a database consisting of a plurality of commonly used emergency "key words";

DETAILED DESCRIPTION

The present invention is described herein in the context of particular exemplary illustrative embodiments. However, it will be recognized by those of ordinary skill that modification, extensions and changes to the disclosed exemplary illustrative embodiments may be made without departing from the true scope and spirit of the instant invention. In short, the following descriptions are provided by way of example only, and the present invention is not limited to the particular illustrative embodiments disclosed herein.

Figure 1:
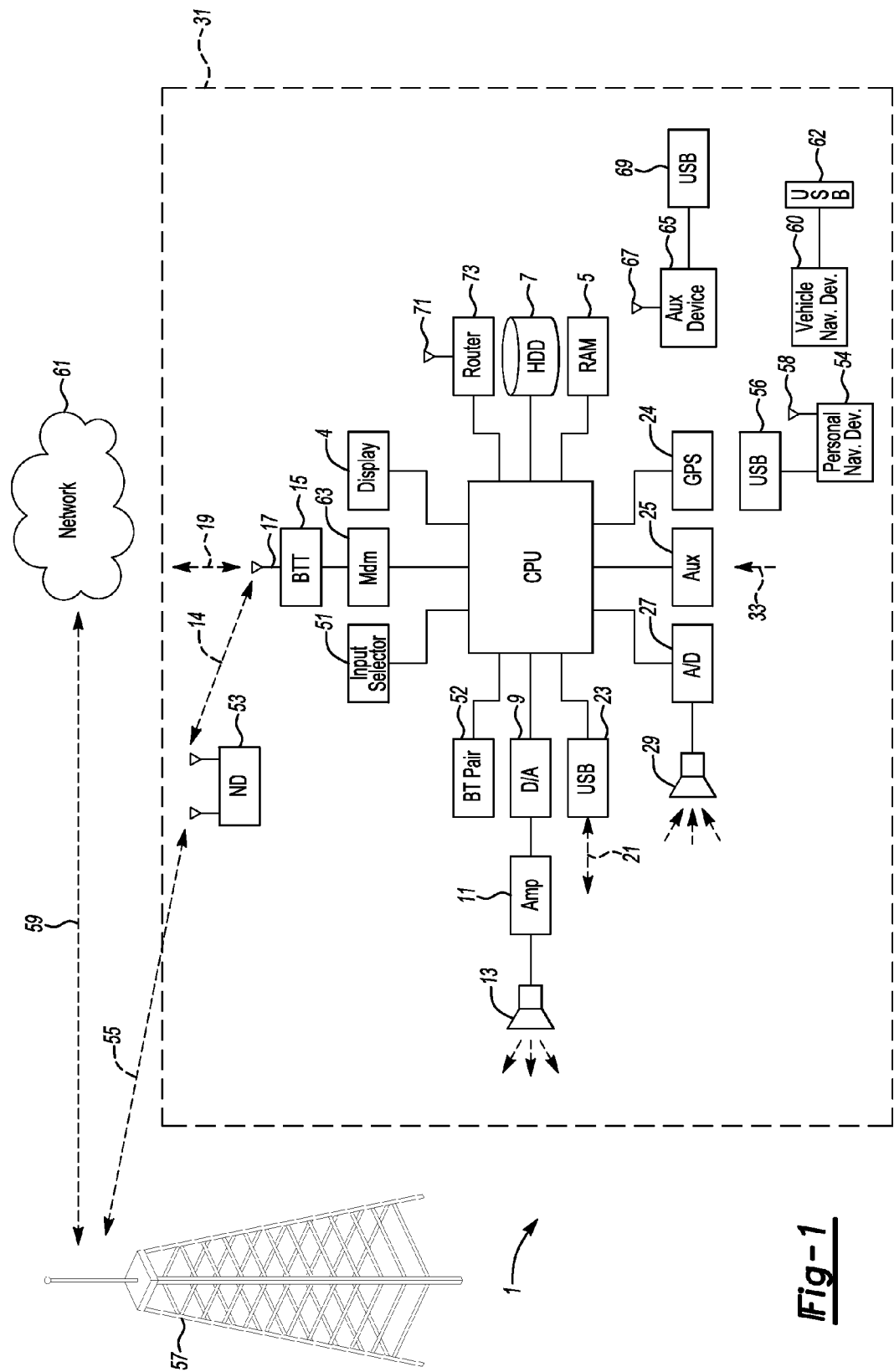
FIG. 1 shows an exemplary illustrative vehicle-based computing system.

FIG. 1 illustrates system architecture of an illustrative onboard communication system usable for delivery of directions to an automobile. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7 (both of which are also memory circuits). In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57.

Pairing a nomadic device 53 and the BLUETOOTH transceiver 15 can be instructed through a button 52 or similar input, telling the CPU that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 in order to transfer data between CPU 3 and network 61 over the voice band. In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Figure 2:
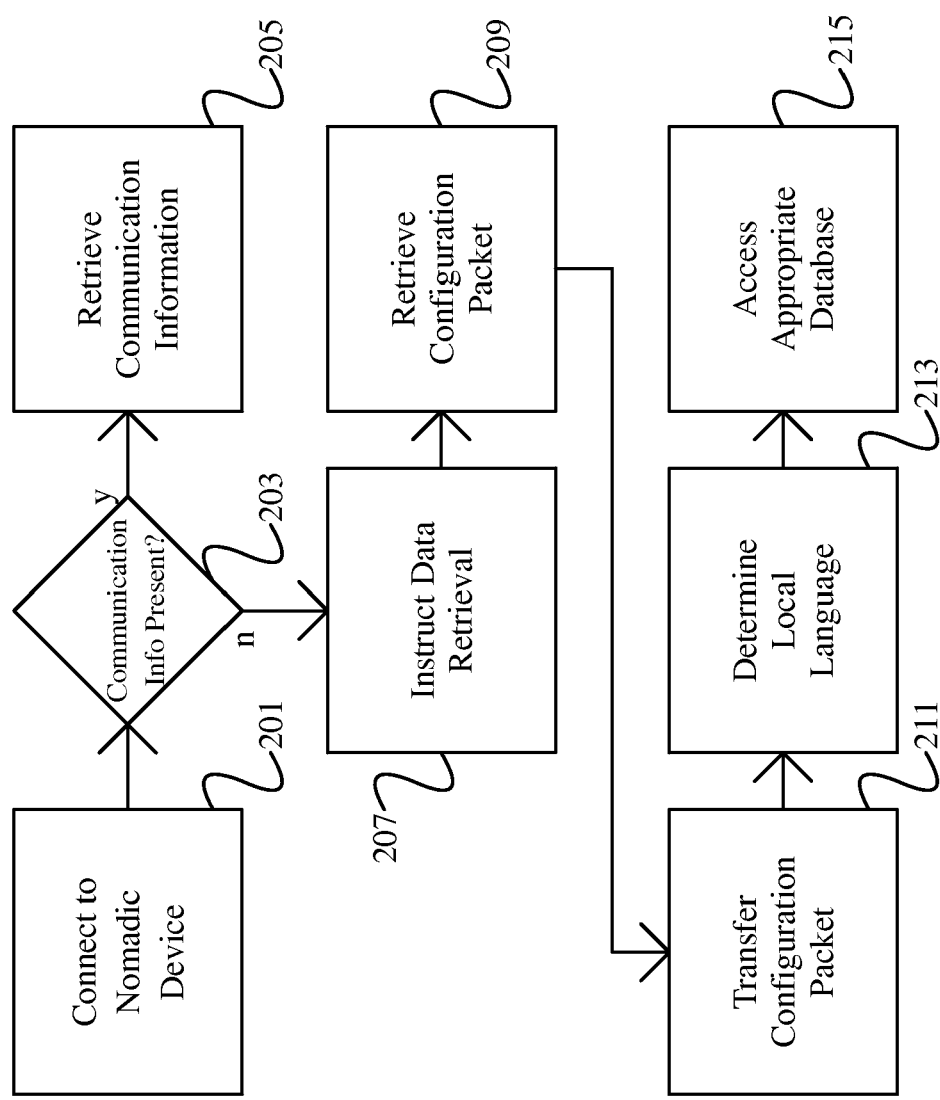
FIG. 2 shows an illustrative example of at least one method for automatically provisioning an emergency call language.

FIG. 2 shows an illustrative example of at least one method for automatically provisioning an emergency call language based on a determination that a new language is appropriate based on, for example, a vehicle location.

Although a user could drive for a thousand miles in America and never cross a national border, such a trip in, for example, Europe, is almost certain to cross one or more national borders. While it may be common for citizens of Europe to each speak several languages, it is not desirable to rely on the ability of an emergency operator to speak the language of a user, when the user is outside of a home country.

For example, if the user originated in France, then the user may have set the vehicle computing system to respond to and speak in French. This could be the user's own language, a common international language, such as English, and may also be the language of the Emergency Operator for any emergency phone calls placed while in France.

If the user were to travel in the vehicle, however, a drive of several hours could easily find the user in Germany. While it may be possible that a particular German Emergency Operator could speak French, it is certainly not preferable to rely on such an occurrence in the event of a vehicle emergency, such as an accident. Further, if the operator doesn't speak French, not only will the vehicle communication system be unable to successfully communicate with the operator in French, but if the driver only speaks French, then even an open line between the driver and the operator will be to no avail.

In this illustrative embodiment, however, the vehicle communication system can automatically switch to a local language, so that emergency communication is possible between the operator and the vehicle, even if no one in the vehicle speaks the appropriate language.

When a cellular phone, or other nomadic device, connects to a cellular tower in, for example, Europe, configuration information may be passed between the tower and the device. This information can be used to establish a connection between the tower and the device, and, in particular, it may also contain a code (such as a mobile country code (MCC)) establishing the country of origin of the tower (or some other designation based on a code).

In this illustrative embodiment, a vehicle computing system polls a paired nomadic device periodically to obtain at least a designation code. The system opens a connection to the nomadic device 201. The system then checks to see if cellular communication information is stored within the device 203.

For example, if the device stores a configuration packet received from a cellular tower or other communication point, then the system may be able to retrieve that packet from the device 205.

If there is no such data stored locally in the device, then the system may instruct the nomadic device to initiate communication with a cellular tower or other communication point 207, in order to receive a configuration packet 209.

The configuration packet is then transferred from the nomadic device to the vehicle computing system 211. Based on an origin code or other designation, the vehicle computing system can determine the local language of choice 213. In this illustrative example, a lookup table is used for this determination, although other suitable methods may also be used.

Once a local language is determined, the vehicle computing system can set up access to, for example, a preset database of words in that language 215. In the event an emergency call is placed, the system can draw on this database to communicate with an emergency operator.

In this illustrative embodiment, fully switching between language packs when the local language changes is not the preferred option. It can take up to a minute to switch the language of the vehicle computing system to another installed language pack. Further, it may be that the language option for the local language is not presently installed in the user's vehicle computing system. Installing the language could require a charge, a lengthy download, or even possibly physical insertion of a persistent memory device containing a new language. Since an accident could occur within seconds of passing into a new country, a delay in switching to the appropriate language may cause failure of an emergency call.

It is possible, however, to perform the illustrative switching of languages using a full language swap. In such an instance it would be desirable, but not necessary, to have a computer with the ability to either speak in two languages at once or swiftly swap between language packs. This would allow communication with the driver in a first language and the operator in a second language. Such embodiments are contemplated and within the scope of the present invention.

In this illustrative embodiment, however, a database consisting of a plurality of commonly used emergency "key words" is used. An example of a portion of such a database is shown in FIG. 3.

For example, the phrase "a crash has occurred at GPS location 100.01, 200.01" may be one common phrase (with the coordinates corresponding to vehicle GPS coordinates).

The vehicle computing system could determine that this phrase needs to be spoken to an emergency operator. Since, in this embodiment, the vehicle computing system is not speaking a local language, it will have to use the language lookup table provided for emergency purposes.

The computing system can break the determined phrase into several portions, such as, but not limited to "a" "crash" "has occurred" "at" "GPS location" "1" "0" "0" "." "0" "1" "2" "0" "0" "." "0" "1". So the vehicle computing system will generate an automatic phrase to be spoken, such as the above phrase, and then a lookup may be performed if the local language is different from the language in which the phrase was generated.

In one illustrative example, a Present Language→Local Language conversion is used. In this example, the system would search a small table (FIG. 5) for the word "a" in a first column 301. Once that word is found, the system would then play or retrieve the local language version of that word 303, saved as an individual sound file, in this example, associated with the table. In such a manner, the entire phrase shown above can be quickly replicated without having to load a new language pack with thousands or tens of thousands of unneeded words.

A dialogue consisting of hundreds or even thousands of possible emergency messages can be developed from only a few hundred or fewer key words. Much or all of the essential information for emergency services can be contained in this dialogue, and thus fast language switching can be performed.

Although this example shows a Present Language→Local Language conversion, it may also be desirable to convert the present language to a common language (such as, for example, English) and then use a Common Language→Local Language lookup table. This might make it easier to create new language tables for languages to be added to the list of possible language choices, since the new language would not then need to be paired with some or all of the existing languages in the system.

In this illustrative example, the vehicle computing system would perform a first lookup to determine the English equivalent of a word to be spoken, and then would cross reference that equivalent with a second lookup table, comprising an English→Local Language conversion, much in the manner of FIG. 3.

Other methods of lookup and conversion are also contemplated, and are within the scope of the present invention. For example, without limitation, each word could be assigned a common table entry number, and the appropriate table entry for a particular word would then be chosen. In such an embodiment, for example, "a" may always be found at entry 1, so the system would know to use the sound bite stored at entry 1 in the local language emergency database when playing the word "a". Other suitable methods may also be used.

Figure 4:
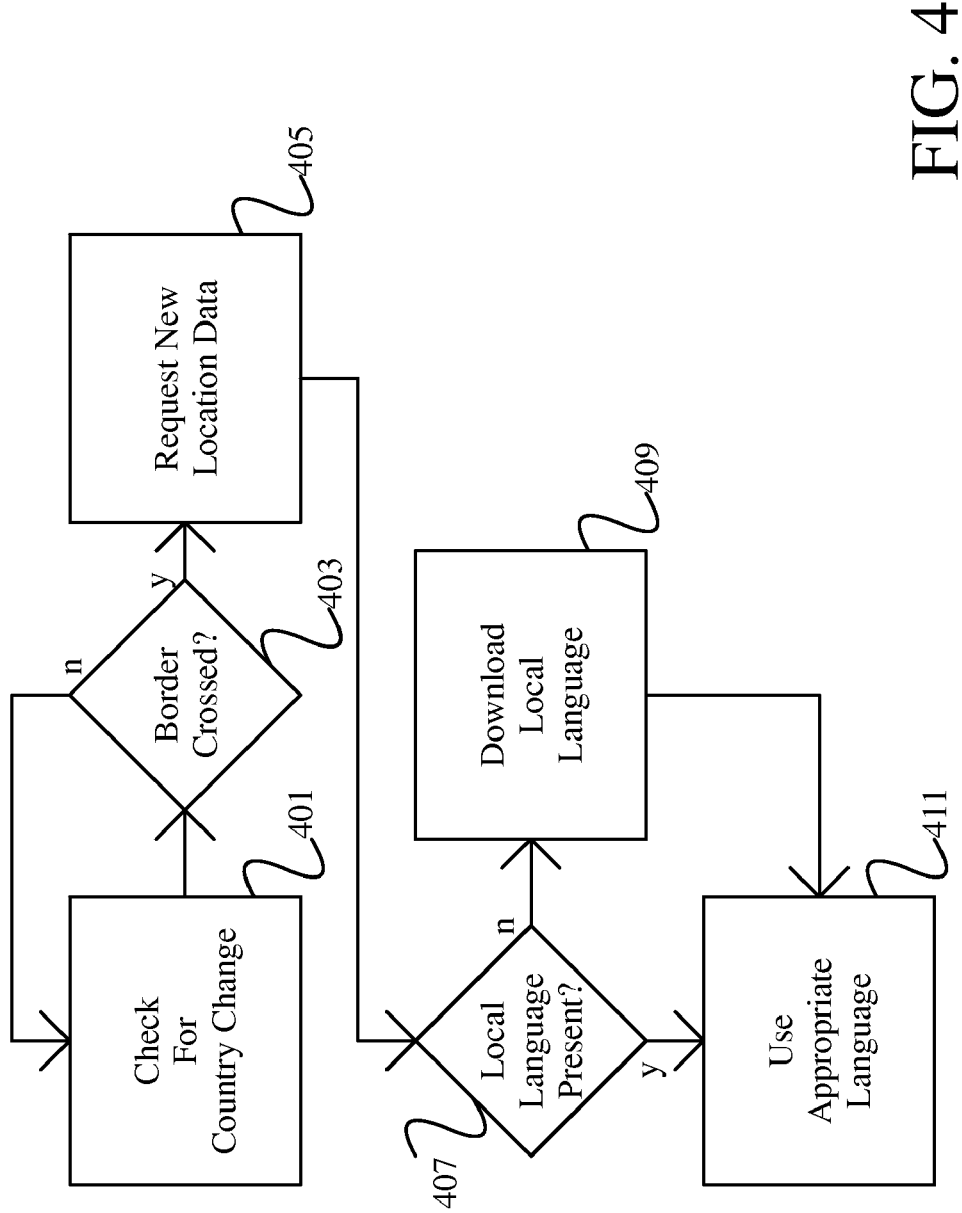
FIG. 4 shows an illustrative embodiment of a routine to determine if a country line is crossed 401.

In yet a further illustrative embodiment, geo-fencing may also be used for one or more purposes in conjunction with the illustrative embodiment. For example, without limitation, geo-fencing may be used to determine which local language is appropriate, or it may be used to determine when a switch between languages needs to be made. In this illustrative embodiment, shown in FIG. 4, the system uses GPS coordinates to determine if a country line is crossed 401. If the user's present coordinates do not indicate that a new country has been entered 403, then the system can continue to poll for country change 401. Else, if a new country has been entered 405, the system can send a signal to a cellular tower to retrieve local language information 407.

In addition to retrieving local language information, the system may not contain the appropriate local language emergency database for the present country of travel. In this illustrative example, once a local language is determined, the system can check to see if a local language emergency database is present 409. If there is no database 411, the system can use the nomadic device to download the local language database 413 (which may result in a user prompt for the download). Once downloaded, that database can be selected as the basis for emergency calls 415.

In yet another illustrative example, the determination that a new country has been entered could be used as the basis for determining a local language. For example, it may be the case that a local cellular signal does not contain a code usable to determine the local language. In this instance, the system can determine, based on the GPS coordinates, in what country the user is presently traveling. The system can then use a lookup table to determine the local language of that country. This lookup table can be stored locally or remotely, since it only needs to be accessed once when a new country is entered. In all of these examples, it is to be understood that language swapping can also be based on crossing non-national borders.

For example, if the northern half of a particular country speaks a first language and the southern half speaks a second language, merely passing between these regions of the same country may be sufficient to trigger a change in the local language. This change again could be recognized by a cellular code, geo-fencing, a combination of factors, etc.

Geo-fencing and/or embedded cellular codes can also be used to determine if a new emergency number should be called in the event of an emergency. For example, in America, the emergency number is 911, but in England it is 999.

It may also be the case that a user does not have, and does not have access to, a local language emergency database. In this event, one of several default situations can be employed. The system could default to English, for example, or to the factory default language based on country of origin. The system could also default to the presently selected language.

In yet another example, the system could receive a request from an emergency operator for a particular language, and, based on that request, use a corresponding language database if available.

In still another illustrative embodiment, it may be the case that certain basic protocols must be followed when placing an emergency call. For example, in certain areas of America, once a call is placed, the number 1 must be pressed on the phone to confirm that an actual emergency is occurring.

These protocols may vary from region to region. A lookup table can also provide regional protocols, so that, based on, for example, a known emergency number or GPS coordinates, the vehicle computing system knows to perform certain protocols while in certain regions to ensure that an emergency call is properly completed.

In these illustrative embodiments, the emergency operator may be given a menu driven set of prompts allowing communication of requested emergency information. Since the vehicle manufacturer knows in advance the configurations of the menus and what types of information may be provided based on those menus, it should be relatively easy to compile a predetermined set of common emergency words and phrases that will make up the emergency language database. Thus, even if the vehicle occupant does not speak the local language, help can still be properly obtained in the event of a vehicle emergency.

What is claimed:

1. A computer-implemented method comprising:
    receiving a language designation added to a packet by a communication point and sent from the communication point; and
    utilizing a local-language emergency database (LLED) whose language corresponds to the language designation as a basis for a vehicle-spoken language, wherein, if an emergency call is originated by a vehicle computing system (VCS), outgoing spoken communication produced by the VCS is based on words and/or phrases stored in the LLED.

2. The method of claim 1, wherein the communication point is a cellular tower.

3. The method of claim 1, further comprising:
    establishing communication between a vehicle computing system and a nomadic device;
        sending a periodic signal to the nomadic device to transfer a language designation known by the nomadic device to the vehicle computing system.

4. The method of claim 3, wherein the periodic signal is at least sent when a predetermined geographic border is crossed by a vehicle.

5. The method of claim 4, wherein the crossing of the geographic border is determined by reference to GPS coordinates.

6. The method of claim 1, further comprising:
    determining a word or phrase to be communicated to an emergency operator from the vehicle computing system;
        looking up the determined word or phrase in a lookup table to determine a corresponding sound bite to be played; and
        playing the determined corresponding sound bite over an outgoing communication with an emergency operator, such that the sound bite communicates the determined phrase in the local language to the emergency operator.

7. The method of claim 6, further comprising:
    breaking the determined phrase into a plurality of smaller words and/or phrases.

8. A vehicle communication system, in communication with a nomadic device, comprising:
    for a processor configured to receive a language or country designation as part of a packet sent from a communication point to the nomadic device, the designation having been added to the packet by the communication point; and
    wherein the processor is further configured to set a local-language emergency database (LLED) as a basis for a vehicle-spoken language when placing emergency calls, wherein, if an emergency call is originated by the vehicle computing system, outgoing spoken communication produced by the vehicle computing system is performed based on words and/or phrases stored in the LLED.

9. The system of claim 8, wherein the communication point is a cellular tower.

10. The system of claim 8, wherein the processor is further configured to
    establish communication between the vehicle computing system and the nomadic device, and
    a periodic signal to the nomadic device to transfer a language designation known by the nomadic device to the vehicle computing system.

11. The system of claim 10, wherein the periodic signal is at least sent when a predetermined geographic border is crossed by a vehicle.

12. The system of claim 11, wherein the crossing of the geographic border is determined by reference to GPS coordinates.

13. The system of claim 8, wherein the processor is configured to
    determine a word or phrase to be communicated to an emergency operator from the vehicle computing system,
    look up the determined word or phrase in a lookup table to determine a corresponding sound bite to be played, and
    play the determined corresponding sound bite over an outgoing communication with an emergency operator, such that the sound bite communicates the determined phrase in the local language to the emergency operator.

14. The system of claim 13, wherein the processor is configured to
    break the determined phrase into a plurality of smaller words and/or phrases.

15. A computer readable storage medium, storing instructions that, when executed by a processor in a vehicle computing system, cause the vehicle computing system to perform the method comprising:
    receiving a language designation or country code as part of a packet sent from a communication point and added to the packet by the communication point; and utilizing a local-language emergency database (LLED) whose language corresponds to the language designation as a basis for a vehicle-spoken language, wherein, if an emergency call is originated by a vehicle computing system (VCS), outgoing spoken communication produced by the VCS is based on words and/or phrases stored in the LLED.

16. The computer readable storage medium of claim 15, wherein the communication point is a cellular tower.

17. The computer readable storage medium of claim 15, wherein the method performed by the vehicle computing system upon execution of the instructions stored on the storage medium further comprises:
  establishing communication between a vehicle computing system and a nomadic device; and
  sending a periodic signal to the nomadic device to transfer a language designation or country code known by the nomadic device to the vehicle computing system.

18. The computer readable storage medium of claim 17, wherein the periodic signal is at least sent when a predetermined geographic border is crossed by a vehicle.

19. The computer readable storage medium of claim 18, wherein the crossing of the geographic border is determined by reference to GPS coordinates.

20. The computer readable storage medium of claim 15, wherein the method performed by the vehicle computing system upon execution of the instructions stored on the storage medium further comprises:
  determining a word or phrase to be communicated to an emergency operator from the vehicle computing system;
  looking up the determined word or phrase in a lookup table to determine a corresponding sound bite to be played; and
  playing the determined corresponding sound bite over an outgoing communication with an emergency operator, such that the sound bite communicates the determined phrase in the local language to the emergency operator.

* * * * *